(No Model.)

L. SHUSTER, Jr.

WATER COCK ATTACHMENT.

No. 311,205. Patented Jan. 27, 1885.

WITNESSES:

John F. Belsterling
H. D. Hughes

INVENTOR

Lawrence Shuster Jr.
by his atty
Thomas D. Moulds

N. PETERS. Photo-Lithographer. Washington, D. C.

UNITED STATES PATENT OFFICE.

LAWRENCE SHUSTER, JR., OF PHILADELPHIA, PENNSYLVANIA.

WATER-COCK ATTACHMENT.

SPECIFICATION forming part of Letters Patent No. 311,205, dated January 27, 1885.

Application filed March 1, 1884. (No model.)

*To all whom it may concern:*

Be it known that I, LAWRENCE SHUSTER, Jr., a citizen of the United States, residing at Philadelphia, in the county of Philadelphia and State of Pennsylvania, have invented certain new and useful Improvements in Water-Cock Attachments; and I do hereby declare the following to be a full, clear, and exact description of the invention, such as will enable others skilled in the art to which it appertains to make and use the same.

My invention relates more particularly to cocks to be used in water-filters that have an inner reservoir for holding the clear water; and the improvement consists in attaching to the ordinary cock a tubular extension having a taper on the end farthest from the cock, and on the outside of the end nearest the cock a tapering screw-thread for engaging with the outer wooden casing of the filter.

Figure 1:
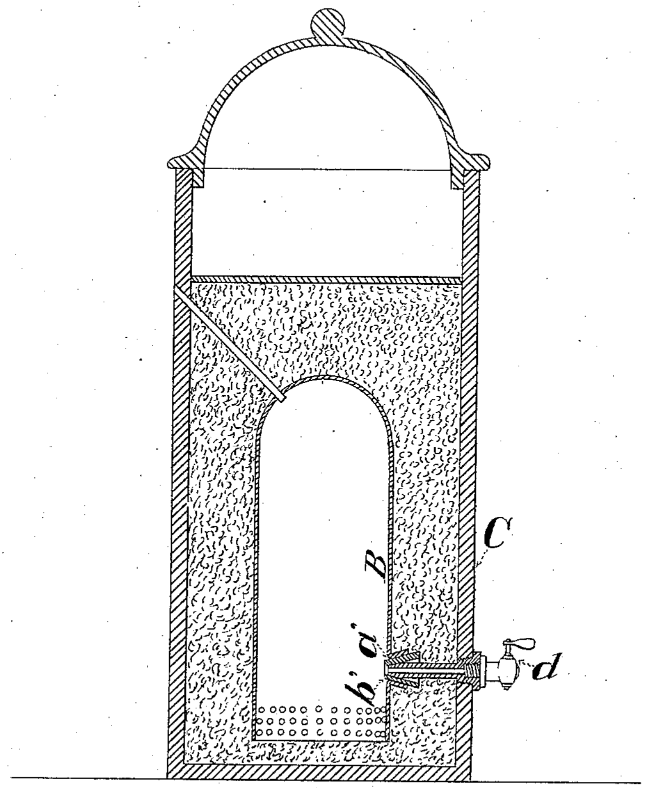
Figure 2:
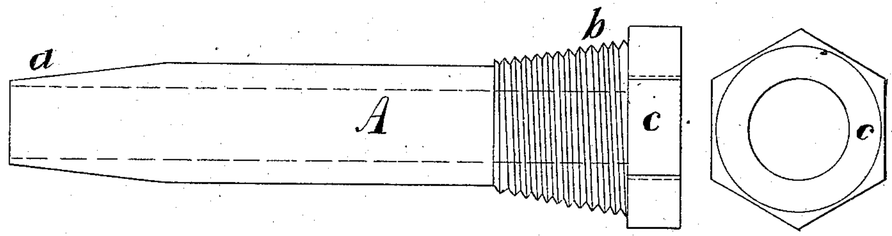

In the accompanying drawings, Figure 1 shows my improvement in position in a filter. Fig. 2 shows the tubular extension detached from the cock.

A represents the tubular extension or attachment; *a*, the tapering end thereof; *b*, a tapering screw-thread thereon; *c*, the outer head of the extension A. This head is shaped so that it can be operated upon by a wrench, and the whole device thus screwed into place. *d* is a water-cock, which may be of any desired pattern or kind; B, the inner reservoir in the filter. This reservoir is preferably made of stone or earthen ware, and is provided with the opening *a'* near the bottom. *b'* is a tubular cork fitting into the opening *a'*, and thus forming a seat or packing for the tapering end of the extension A. C is the outside wooden casing of the filter, and is provided with the proper-sized opening for inserting the extension. Between the inner reservoir and the outer casing the filtering material is packed. The inner reservoir and the outer casing of the filter being placed in the proper position and the tubular cork fitted into the opening *a'*, the tubular extension A is inserted, and the tapering end thereof fitted into the opening or hole in the cork *b'*. It is then pushed into place until the tapering screw-thread *b* engages with the wooden casing C, when a wrench is adjusted on the head *c* and the whole screwed tightly into position. It will be readily seen that as the screw-thread *b* enters the wooden casing C the tapering end *a* is forced into the opening in the cork *b'*, thus simultaneously forming two secure and water-tight joints.

Having thus described my invention, what I claim as new, and desire to secure by United States Letters Patent, is—

1. The tubular extension A, having the tapering point *a* and tapering screw-thread *b*, in combination with the inner reservoir, B, outer casing, C, and cock *d*, substantially as and for the purpose described.

2. The tubular extension or attachment A, having the tapering point *a*, and provided on the opposite end with the tapering screw-thread *b*, in combination with an inner vessel, B, and outer casing, C, substantially as and for the purpose described.

In testimony whereof I affix my signature in presence of two witnesses.

LAWRENCE SHUSTER, JR.

Witnesses:
OTIS EGAN,
THOMAS D. MOWLDS.